United States Patent [19]

Matsuo et al.

[11] Patent Number: 5,173,372
[45] Date of Patent: Dec. 22, 1992

[54] SUPPORTING MEMBER FOR SOLID OXIDE FUEL CELL

[75] Inventors: Youji Matsuo, Kurobe; Toshio Arai, Toyama, both of Japan

[73] Assignee: Yoshida Kogyo K.K., Tokyo, Japan

[21] Appl. No.: 832,866

[22] Filed: Feb. 7, 1992

[30] Foreign Application Priority Data

Feb. 7, 1991 [JP] Japan ................................. 3-36505

[51] Int. Cl.$^5$ ............................................. H01M 8/12
[52] U.S. Cl. .......................................... 429/31; 429/33
[58] Field of Search ................................. 429/30-33, 429/45, 218

[56] References Cited

U.S. PATENT DOCUMENTS

| | | | |
|---|---|---|---|
| 4,562,124 | 12/1985 | Ruka | 429/30 |
| 4,767,518 | 8/1988 | Maskalick | 204/242 |
| 4,799,936 | 1/1989 | Riley | 29/623.1 |
| 4,833,045 | 5/1989 | Pollack et al. | 429/30 |
| 4,943,494 | 7/1990 | Riley | 429/30 |

Primary Examiner—Anthony Skapars
Attorney, Agent, or Firm—Flynn, Thiel, Boutell & Tanis

[57] ABSTRACT

The present invention provides a composite material suitable for use as the supporting member for a fuel cell, the composite material comprising $(100-A)$ % by mole of MgO and A % by mole of $MgAl_2O_4$ (wherein A is 14 to 64) and having a coefficient of thermal expansion close to that of a electrolyte YSZ, which is used as a solid electrolyte in the fuel cell, and a high thermal conductivity. By using the above supporting member, no cracking occurs in the electrolyte at high temperature during the use thereof and further during the preparation thereof, so that no lowering in the electromotive force occurs.

2 Claims, 4 Drawing Sheets

SUPPORTING MEMBER FOR SOLID OXIDE FUEL CELL

BACKGROUND OF THE INVENTION

1. Field of the Invention

The present invention relates to an improvement of a cell supporting member in a solid oxide fuel cell for providing an electric energy through an electrochemical reaction.

2. Description of the Prior Art

The conventional solid oxide fuel cell known in the art comprises a first cell and a second cell provided adjacently to each other and each provided with a slender, annular, porous supporting tube and, provided on the surface thereof, an inner annular electrode, an outer annular electrode and an electrolyte interposed between the inner and outer annular electrodes, and an interconnector passing through the outer annular electrode and the electrolyte to reach a selected partition of the inner electrode, the inner annular electrode of the first cell being connected in series to the outer annular electrode of the second cell through the interconnector of the first cell and a metallic felt disposed between the first cell and the second cell (see Japanese Patent Laid-Open No. 130381/1982).

A supporting member made of alumina or calcias-tabilized zirconia (CSZ) as disclosed in Japanese Patent Laid-Open No. 33853/1989 is known as the supporting member (corresponding to the supporting tube in the above-described solid oxide fuel cell) of the solid oxide fuel cell.

When the supporting tube made of alumina is used, however, since the coefficient of thermal expansion of the electrolyte (yttria-stabilized zirconia [YSZ]) in the cell part formed on the surface of the supporting tube is different from that of the alumina of the supporting tube, thus cracking occurs in a densely formed electrolyte film during the use of the cell (at a high temperature). This brings about leakage of a fuel (for example, hydrogen) which decreases the difference in the concentration between the outer electrode side and the inner electrode side (in general, the fuel may be fed to any of the inner electrode and the outer electrode) so that the chemical potential difference decreases, which lowers the electromotive force. Further, hydrogen leakage causes reduction of the air electrode constituting the outer electrode or inner electrode. Further, the leaked hydrogen generates heat, which brings about unfavorable cracking in the locally heated supporting tube.

When a supporting tube made of CSZ is used, the above-described problem derived from the difference in the coefficient of thermal expansion between the materials does not occur. In this case, however, when the cell part is formed on the CSZ supporting tube, for example, by means of thermal spraying, the temperature rises particularly on the thermally sprayed surface since CSZ has a small thermal conductivity. This brings about local expansion, causing unfavorable cracking to occur. Further, the CSZ itself is expensive.

SUMMARY OF THE INVENTION

The present invention solves the above-described problems through the use of a supporting member for a solid oxide fuel cell, which member has a coefficient of thermal expansion close to that of YSZ used as the material for the electrolyte and a high thermal conductivity.

The present invention relates to a supporting member for a solid oxide fuel cell having a surface provided with a cell part comprising an inner electrode, an outer electrode and, interposed between said inner and outer electrodes, a zirconia electrolyte stabilized with yttria, characterized in that the supporting member is made of a composite material comprising $(100 - A)$ % by mole of MgO and A % by mole of $MgAl_2O_4$ wherein A is 14 to 64.

The above-specified composite material for the supporting member is preferably prepared by sintering a mixture comprising $(100 - X)$ % by mole of MgO and X % by mole of $Al_2O_3$ wherein X is 7 to 32.

DETAILED DESCRIPTION OF THE PREFERRED EMBODIMENTS

The supporting member for a solid oxide fuel cell according to the present invention will be more specifically described, taking a supporting member made of an $MgO-MgAl_2O_4$ composite material prepared by sintering MgO and $Al_2O_3$, by way of example.

Figure 1:
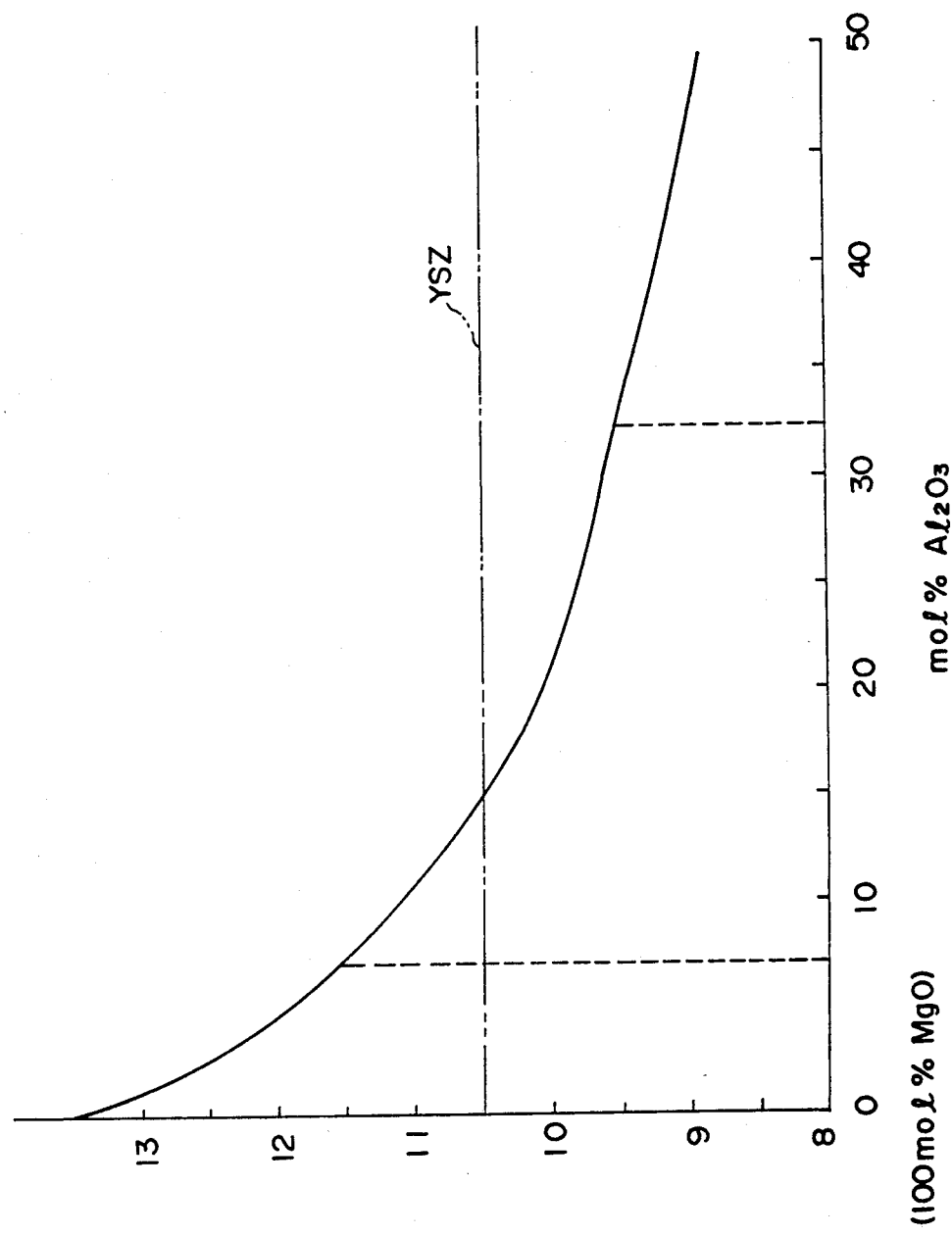
FIG. 1 is a graph showing the relationship between the $Al_2O_3$ concentration and the average coefficient of thermal expansion of the cosintered composite material composed of MgO and $MgAl_2O_4$ to be used in the present invention.

A sintering material comprising MgO and $Al_2O_3$ provides a cosintered composite material of MgO and $MgAl_2O_4$ when the $Al_2O_3$ content in the sintering material is less than 50% by mole. FIG. 1 is a curve showing the average coefficient of thermal expansion ($\times 10^{-6}$ °C.$^{-1}$) of the resulting composite material in the temperature range of from 0 to 1000° C. In FIG. 1, although the coefficient of thermal expansion is plotted against the $Al_2O_3$ content (% by mole) of the sintering material, the relationship between the coefficient of thermal expansion and the $MgAl_2O_4$ content of the composite material will be readily apparent from the curve shown in FIG. 1, because the $MgAl_2O_4$ is twice the $Al_2O_3$ content. In FIG. 1, the two-dot chain line represents the average coefficient of thermal expansion of YSZ ($10.5 \times 10^{-6}$ °C.$^{-1}$), and the intersection of the two-dot chain line and the curve corresponds to an $Al_2O_3$ content of 15% by mole, i.e., an $MgAl_2O_4$ content of 30% by mole. For this reason, in the present invention, a tolerance of about $\pm 1$ was provided to the average coefficient of thermal expansion, and the X value as the $Al_2O_3$ content in terms of % by mole was limited to 7 to 32. Such an $Al_2O_3$ content range provides a composite material comprising $(100 - A)$ % by mole of MgO and A % by mole of $MgAl_2O_4$ wherein A is 14 to 64. When the X value exceeds the above-described range, as is apparent from FIG. 1, the difference in the coefficient of thermal expansion between the composite material and the YSZ becomes so large that the object of the present invention cannot be attained. That is, the coefficient of thermal expansion of the supporting member according to the present invention should be in the range of from $9.5 > 10^{-6°}$ C.$^{-1}$ to $11.5 \times 10^{-6°}$C.$^{-1}$. Further, the supporting member according to the present invention has a high thermal conductivity, an insulation exceeding $10^5$ Ω·cm, is less susceptible to reduction because it has no reactivity, and is inexpensive.

While the invention has been particularly described with reference to the $MgO\text{-}MgAl_2O_4$ composite material prepared from MgO and $Al_2O_3$, the composite material of the present invention comprising MgO and $MgAl_2O_4$ in the above-specified percentages by mole may be prepared from other materials, such as a mixture of MgO and $MgAl_2 O_4$, a mixture of $Mg(OH)_2$ and $Al(OH)_3$, etc.

The embodiments of the present invention will now be described with reference to the accompanying drawings.

EXAMPLES

Figure 2:
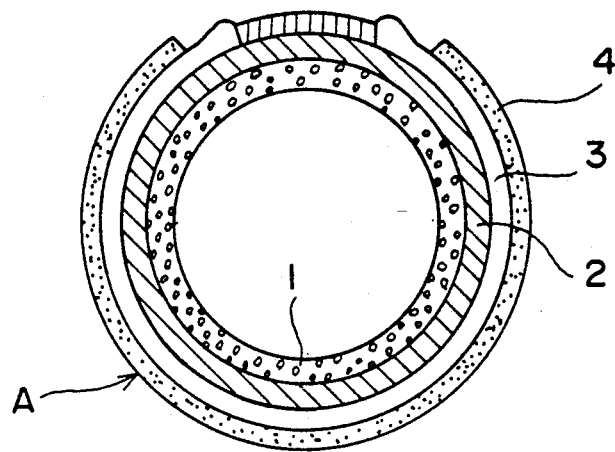
FIG. 2 is a cross-sectional view of an embodiment of the present invention.

FIG. 2 shows one embodiment of the present invention. Numeral 1 designates a porous base member (supporting member) according to the present invention which is made of a composite material of MgO and $MgAl_2O_4$ having an $MgAl_2O_4$ content of 30% by mole. A 100 μm-thick inner electrode 2 made of Ni-zirconia cermet, a 100 μm-thick electrolyte 3 comprising YSZ and a 100 μm-thick outer electrode 4 made of $LaMnO_3$ doped with Sr are laminated in that order on the surface of the base member 1 to form a cell part A.

Figure 3:
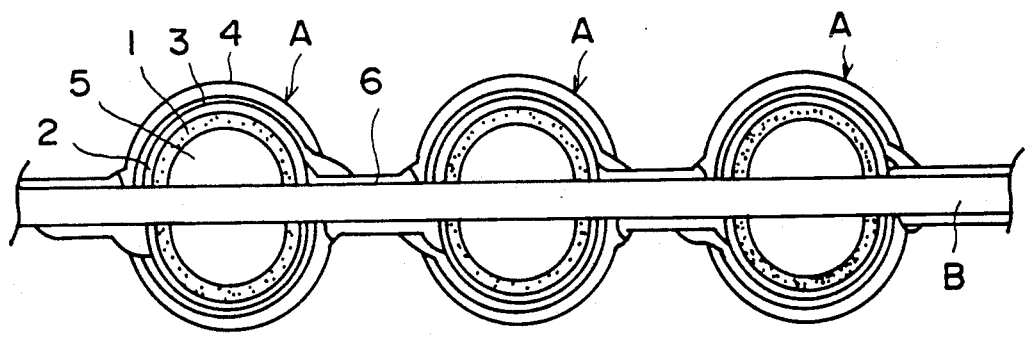
FIG. 3 is a cross-sectional view of a further embodiment of the present invention.

In an embodiment shown in FIG. 3, 0.5 mm-thick porous base members 1 are provided on both sides of a 3 mm-thick base plate B made of a dense material so as to form hollow parts 5, thereby giving the supporting member according to the present invention through the use of the base plate B and the base member 1. On each supporting member is formed a cell part A having the same layer construction as that shown in the FIG. 2. An interconnector 6 is provided so as to extend from the site of contact of the inner electrode 2 with the base plate B through the electrolyte 3 constituting the same cell part A to reach the outer electrode 4 of the adjacent cell part A, thereby connecting individual cell parts A in series with each other.

Figure 4:
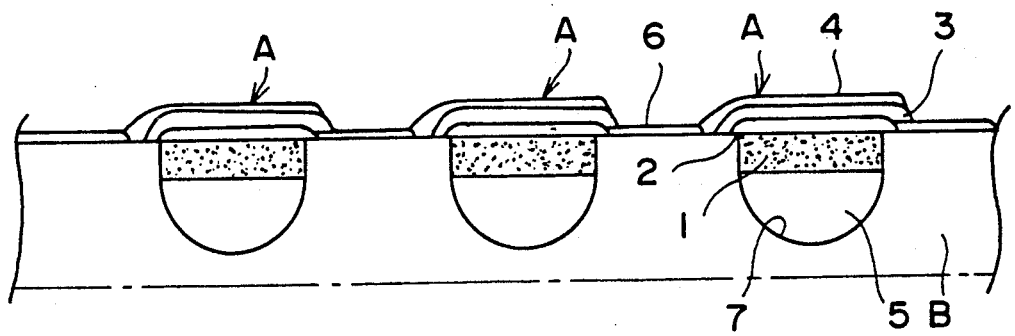
FIG. 4 is a cross-sectional view of a further embodiment of the present invention.

In an embodiment shown in FIG. 4, concaves 7 are provided on a base plate B made of a dense material, and a porous base member 1 is fitted into the opening of each concave 7 so as to provide a hollow part 5, thereby constructing the supporting member of the present invention. On each supporting member are laminated an inner electrode 2, an electrolyte 3 and an outer electrode 4 in that order to form a cell part A. Further, the inner electrode 3 of each cell part A is connected to the outer electrode 4 of the adjacent cell part A by means of an interconnector 6.

Figure 5:
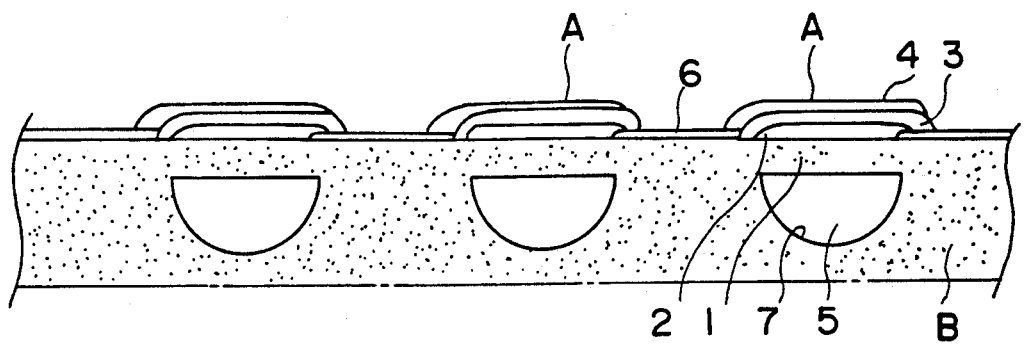
FIG. 5 is a cross-sectional view of a further embodiment of the present invention.

In an embodiment shown in FIG. 5, the porous base member 1 and the base plate B made of a dense material shown in the FIG. 4 are integrated with each other to form a porous supporting member. The supporting member is one made of the composite material of MgO and $MgAl_2O_4$ according to the present invention.

Figure 6:
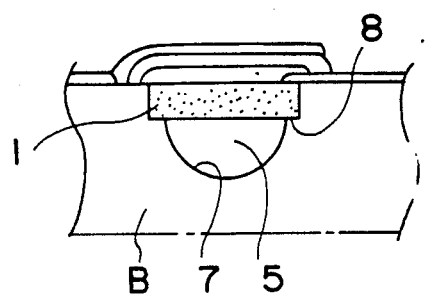
FIG. 6 is a cross-sectional view of the present invention.

In an embodiment shown in FIG. 6, in order to improve the stability, a porous base member 1 is placed on a step 8 formed around the opening of the concave 7 of the base plate B made of a dense material.

Figure 7:
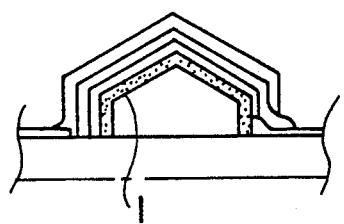
FIG. 7 is a cross-sectional view of a further embodiment of the present invention.

FIG. 7 shows a modified embodiment wherein the cross section of the porous base member 1 is polygonal.

Figure 8:
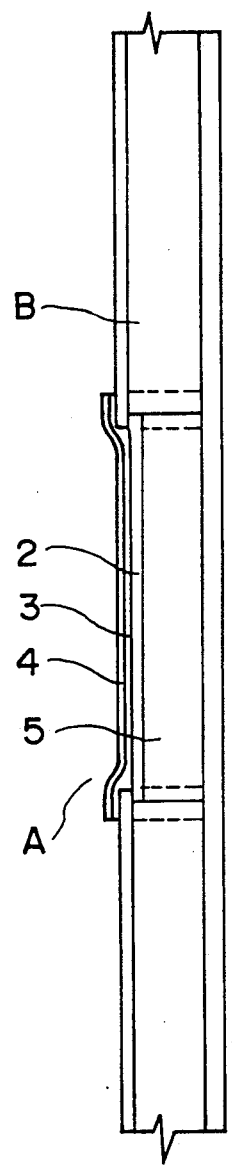
FIG. 8 is a cross-sectional view of a further embodiment of the present invention.

In an embodiment shown in FIG. 8, the composite material of MgO and $MgAl_2O_4$ is extruded into a molding having a hollow part 5 and holes are provided at appropriate intervals at those parts where cell parts A are formed, thereby forming a base plate B (a supporting member) made of a dense material according to the present invention. An inner electrode 2 is provided in each hole, and an electrolyte 3 and an outer electrode 4 are laminated thereon.

Since the composite material composed of MgO and $MgAl_2O_4$ of the present invention has a coefficient of thermal expansion close to that of YSZ as a solid electrolyte, there is no possibility that cracking may occur in the electrolyte at high temperature during the use of a cell to bring about fuel leakage. Thus, no lowering in the electromotive force occurs. Further, the composite has a high thermal conductivity, an insulation exceeding $10^5$ Ω·cm, no reactivity and a low cost, which renders the composite material suitable as a supporting member for a solid oxide fuel cell.

We claim:

1. A supporting member for a solid oxide fuel cell having a surface provided with a cell part comprising an inner electrode, an outer electrode and, interposed between said inner and outer electrodes, a zirconia electrolyte stabilized with yttria, characterized in that said supporting member is made of a composite material comprising (100 −A) % by mole of MgO and A % by mole of $MgAl_2O_4$ wherein A is 14 to 64.

2. A supporting member as claimed in claim 1, wherein said composite material is a cosintered material prepared by sintering a material comprising (100 −X) % by mole of MgO and X % by mole of $Al_2O_3$ wherein X is 7 to 32.

* * * * *